UNITED STATES PATENT OFFICE.

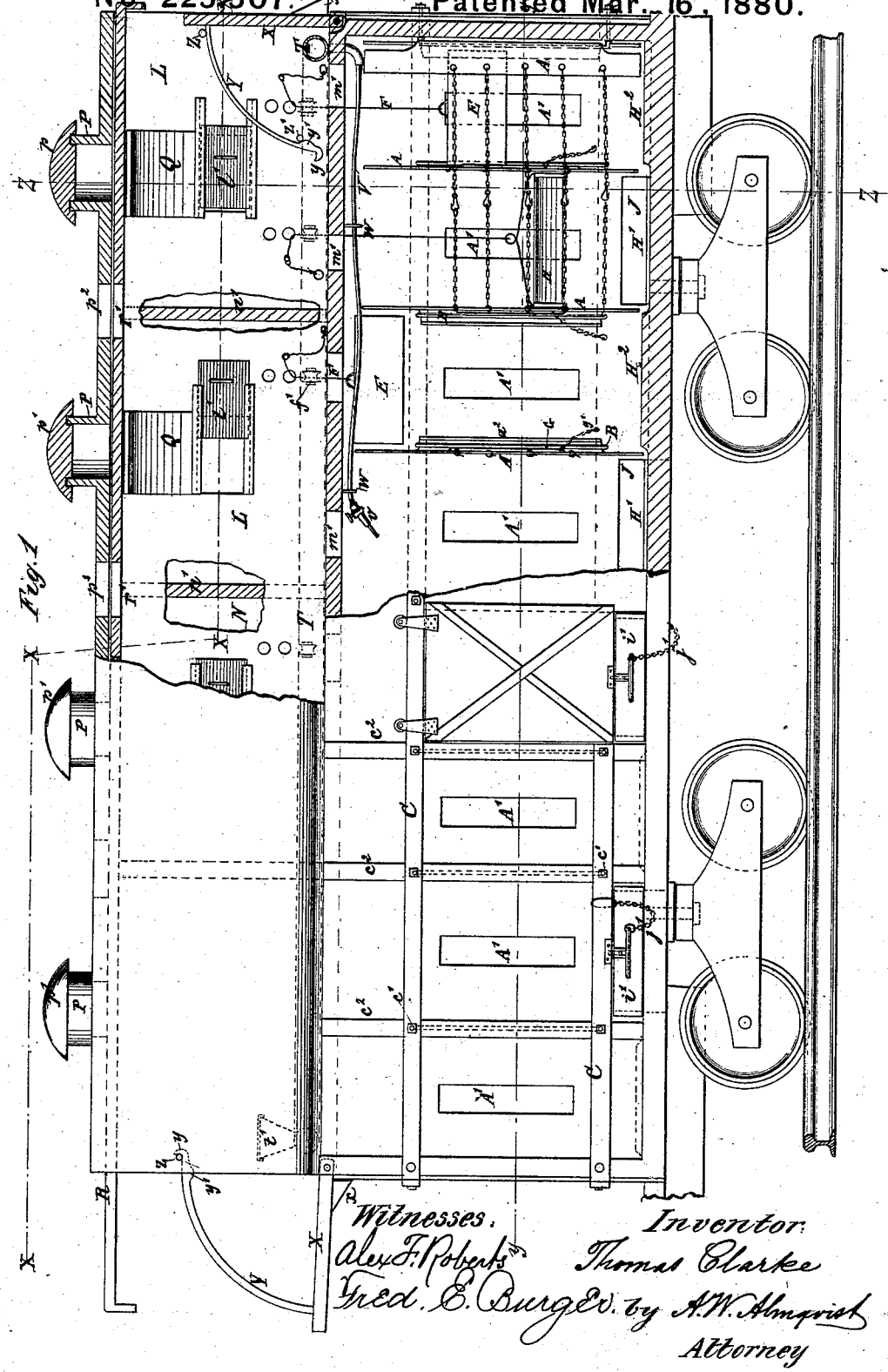

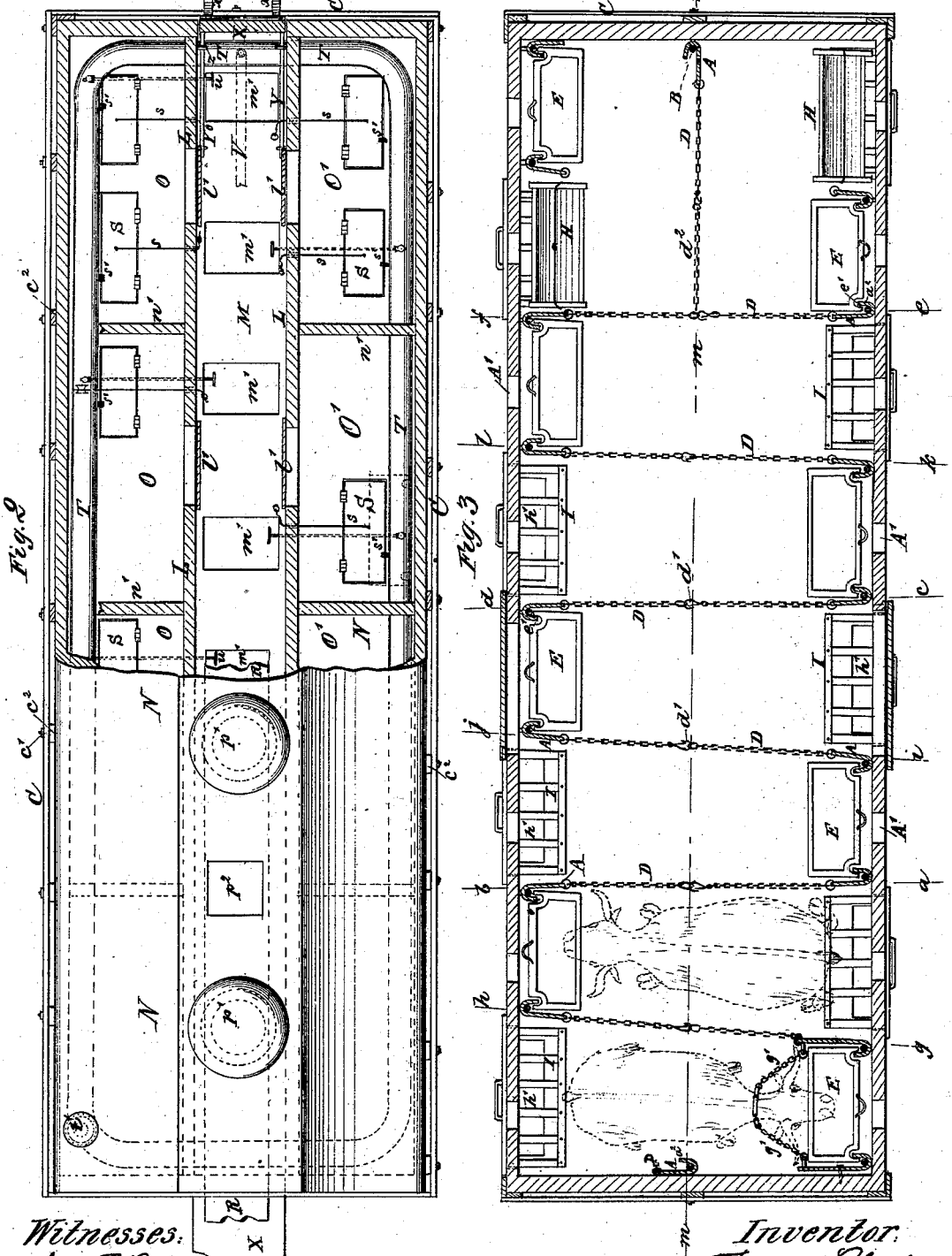

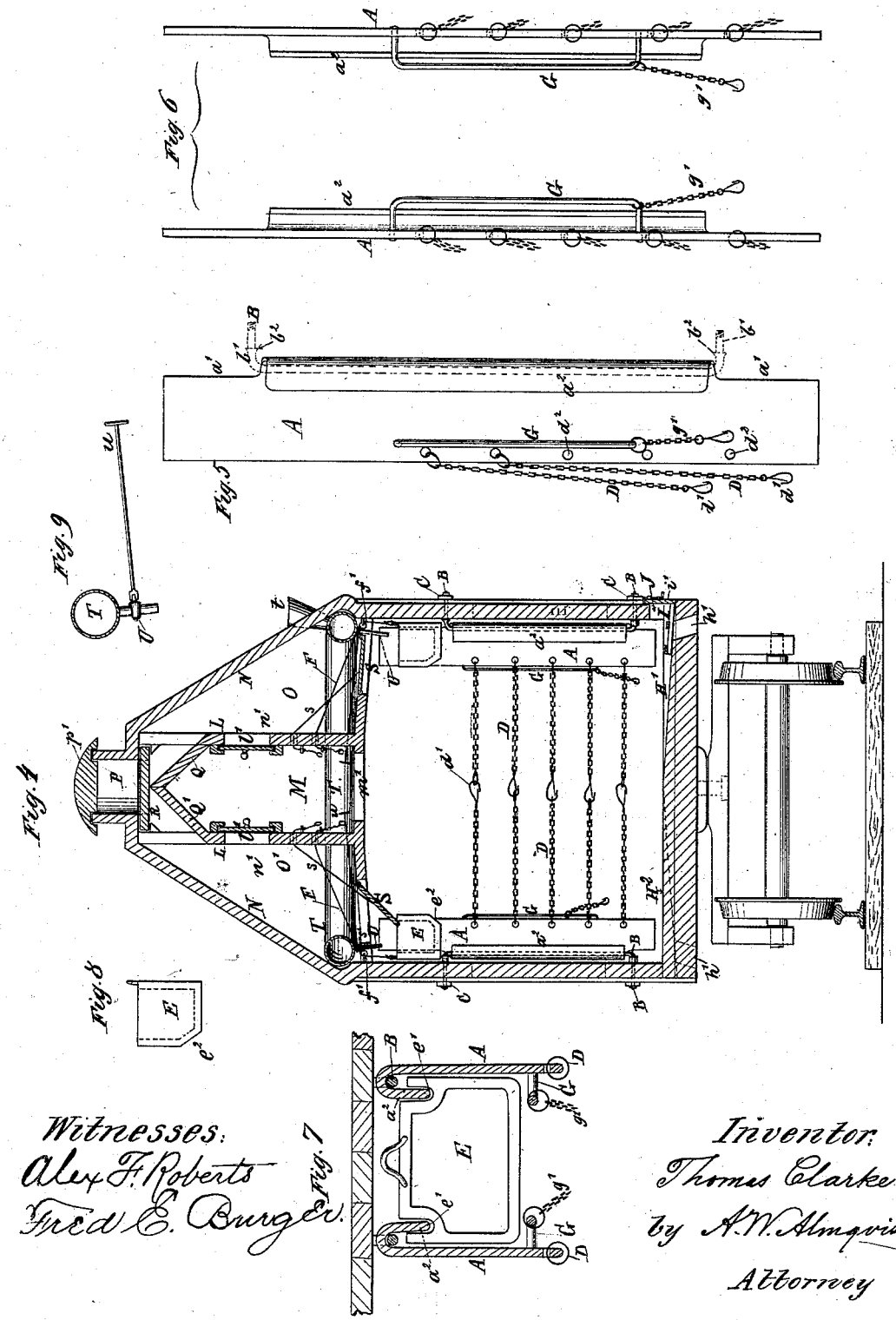

THOMAS CLARKE, OF TRURO, NOVA SCOTIA, CANADA.

STOCK-CAR.

SPECIFICATION forming part of Letters Patent No. 225,507, dated March 16, 1880.

Application filed December 15, 1879.

*To all whom it may concern:*

Be it known that I, THOMAS CLARKE, of Truro, in the county of Colchester and Province of Nova Scotia, Canada, have invented a new and useful Improvement in Live-Stock Freight-Cars, of which the following is a specification.

My invention relates to improvements in freight-cars such as are used on railroads for transporting cattle, horses, and other live stock for considerable distances.

It is a well-known fact that, owing to the deficient construction of cattle-cars hitherto in use, the animals during transportation are huddled together without food, drink, and necessary ventilation, and without the comfort of separation and cleanliness, and are thus not only exposed to a great deal of suffering, but, as a consequence, many die during a long transportation, and a much greater number become diseased before reaching their destination, thus rendering their flesh unfit as food for man.

The object of my present invention is to overcome said difficulties by providing a freight-car of such construction that it may be readily and conveniently changed into a stable with suitable stalls or pens, or both, to accommodate and keep separate a greater or less number of animals, to supply them with food, water, and ample ventilation, and to sprinkle and clean their stalls.

My invention will be fully understood by the following description, with reference to the accompanying drawings, in which—

Figure 1, Sheet 1, represents a side elevation, partly in longitudinal vertical central section, of a freight-car for live stock constructed according to my present invention. Fig. 2, Sheet 2, is a plan view of the same, partly in horizontal section, taken on the line $x\ x$ of Fig. 1. Fig. 3, Sheet 2, is a horizontal section of the same through the line $y\ y$ of Fig. 1. Fig. 4, Sheet 3, is a vertical cross-section of the same, taken through the line $z\ z$ of Fig. 1. Fig. 5 is a side elevation of one of the hinged side posts of a stall-head. Fig. 6 is a front elevation of the two hinged posts which form a stall-head. Fig. 7 is a horizontal section of the same, with a top view of one of the feed and water buckets. Fig. 8 is a side view of one of the said buckets. Fig. 9 is a detail cross-section of the water-tank with water-tap and operating-handle.

Similar letters of reference indicate corresponding parts in the different figures.

The body of the car is provided with horse or cattle stalls or booths, in the following manner: Division-lines $a\ b$, $c\ d$, $e\ f$, &c., (see Fig. 3,) parallel with the end walls of the car, are made to inclose spaces $a\ b\ d\ e\ a$, &c., each space being of proper size to contain two stalls. These spaces are then subdivided in two spaces each by the somewhat diagonally-drawn lines $g\ h$, $i\ j$, $k\ l$, &c., converging with the lines $a\ b$, $c\ d$, &c., toward the headstalls, and diverging toward the opposite end of the stalls, in order to economize space, and at the same time to better prevent interference with each other of the animals, which latter are placed as indicated in the drawings, the heads of any two adjacent ones facing alternate side walls of the car. When used partly or wholly to carry hogs or sheep the car is also divided longitudinally, partly or wholly, along the line $m\ m\ n$.

The posts and chains (or ropes) forming the real partitions between the stalls are hinged and stretched in the vertical planes indicated by the aforesaid division-lines.

A are the side posts, every two of which, arranged in pairs on opposite sides of the car, form a stall-head. These are preferably made of iron plates having a portion cut away at top and bottom along one of the vertical edges at $a'$, and the edge $a^2$, thereby left projecting from the main portion, turned back upon the latter in the shape (when seen in cross-section) of a staple or letter U, having one leg much longer than the other. By this bend a plate, A, may easily be hinged or unhinged upon or from the vertical main portion of an iron rod, B, having its ends $b'$ bent at right angles and passed through the wall of the car and through bars C, to which the said ends are held by nuts $c'$ on the outside of the wall, a ring or shoulder, $b^2$, in the bend of the rod affording space between the latter and the inside of the wall, to allow of inserting the edge $a^2$ in hinging the plate A upon the rod B.

The ends $b'$ of each rod B are put through a vertical strengthening rib or bar, $c^2$, on the outside of the car before going through and being secured to the bars C. The latter are thus bolted to the outside of the vertical bars $c^2$, and, running the whole length and across the ends of the car, serve as braces to materially strengthen the walls of the car against the strain to which they may be subjected by the attempts of the cattle to get loose during the jolting of the car when in motion.

The bars C are intended to be made of iron. The vertical ribs $c^2$ keep the horizontal bars C from the surface of the walls between said ribs a distance equal to the thickness of the ribs $c^2$, thus affording space to allow of a chain or chain-ring being passed around and attached to the bars C, for keeping the floor-slides in place, as hereinafter shown, or for other purposes.

The bars C on the side walls of the car are omitted in Fig. 3 in order to better show the parts lying underneath them.

The side pieces, A, being hinged on the rods B, as before described, may be turned to rest flat against the walls, and thus occupy a very small space when not in use; but when needed to form stalls they are swung out, as in Figs. 3 and 4, and connected to those on the opposite side by stretched chains (or ropes) D, joined together in the middle by snap-hooks $d'$, the other ends of the chains being attached to the edge of the plates A by rings going through the holes $d^2$. When in this position the inner edges, $a^2$, of each pair of plates or hinged side posts, A A, forming a stall-head, serve as guides for the feed and water buckets E, which latter have corresponding vertical grooves $e'$ on their rear side, adapting them to slide upon the guides $a^2$ when raised or lowered by cords F, running over pulleys $f'$ and operated above. The buckets E may be still further guided and prevented from swinging forward out of the guides $a^2$ by vertical hitching-rods G, secured to the plates A, as shown in Figs. 6 and 7, in juxtaposition to each other and in front of the buckets.

The rods G are provided with short sliding chains, $g'$, attachable one on each side by a snap-hook to a collar on the animal's neck, as illustrated at the left end of Fig. 3, so as to hitch the latter securely to the stall-head, while allowing it perfect freedom to feed and drink, the chains $g'$ sliding on the rods G with the raising and lowering of the animal's head.

In feeding horses or cattle the buckets E are used for holding cut feed and water simultaneously or successively; but in feeding hogs and sheep they are used for water only, the grit or other feed being supplied in troughs H, hoisted between the guiding outer surfaces of the hinged side plates, A, of two adjacent stalls, as shown at the right end of Fig. 3, where two pens or folds are formed by connecting the chains D of the plate A, hinged at the end of the car by other chains, $d^2$, in the line $m\ n$, to one or other of the sets of chains which form the cross-partitions in the lines $e\ f$, $c\ d$, &c. When the whole car needs to be occupied for pens or folds the chains $d^2$ are continued throughout the length of the car and hooked to the chains D of the plate A, hinged at the opposite end wall of the car.

To assist in entering the bucket E, in lowering the same within the hitch-bars G, the front side of the bucket may be beveled off on its lower edge, as shown in Fig. 8.

The floor of the car is made level from the wall at the head of each stall to the center line $m\ m\ n$, and inclining downward from the said center line to the opposite wall at the rear end of each stall, thus leaving at the side of each horizontal surface $H^2$ of a stall an inclined depressed surface, H', in which the water and spillings from the animals flow down and are discharged through holes or openings $h'$, cut through the floor of the car near the wall, in the lowest part of the slope H', one opening in each slope. Each opening $h'$ is covered by a sliding grate, I, which is inserted and removed through an opening, J, in the wall, of suitable size to allow of the introduction therein of a scraper, wherewith the dirt on the floor is raked down into the floor-opening $h'$. The opening J is closed when the floor-slide I is in place by the vertical board, $i'$, of the slide, which board is provided with a spring-bolt for locking the slide I to the wall or to the bar C, and with an operating-handle having attached to it one end of a chain, $j'$, whose other end goes around and is secured to the bar C, to prevent the slide from accidentally falling off and getting lost.

The walls of the car are provided with apertures A' in sufficient number for ample ventilation.

Above the roof of the ordinary cattle-car I arrange a second story for holding feed and water supplies for the live stock below, and just only high enough to allow of the manipulations necessary for that purpose. Said upper story is divided longitudinally by the walls L into a central passage, M, (just wide enough for an attendant to walk through,) and two store-rooms, N, one on each side of the passage M, which store-rooms N are subdivided by transverse partitions $n'$ in the vertical planes $a\ b, c\ d, e\ f$, &c., into pairs of bins O O' for cut feed, so that the attendant, standing in the central passage, M, between a pair of bins, can fill the feed and water buckets of one stall at his left and of another stall at his right side before proceeding to the next pair of bins.

The roof covering the store-rooms N is made slanting downward on either side of the central passage, M, as shown in the drawings, and the portion of the roof covering the said passage is horizontal, and provided, in the central vertical plane of each pair of bins, O O', with a feed-opening or hopper, P, through which (its cover $p'$ being first removed) the cut feed is supplied to the pair of bins O O' simultaneously by falling upon the dividing-angle of the inclined feed-boards Q Q' of the pair of bins O O', arranged as shown in Figs. 1 and 4.

The roof between the hoppers P is provided with air-apertures $p^2$, which, with the openings in the hoppers, are arranged equidistant apart. Underneath the horizontal roof, between the same and the angle of the feed-boards Q Q', along the whole length of the central passage, M, is arranged a slide, R, provided with equidistant apertures $r'$, corresponding to the apertures P $p^2$, and the floor of the passage M is provided with series of grated (or not grated) vent-holes $m'$, so that when the slide R is placed as in Figs. 1 and 4 abundant ventilation may be afforded the animals through the apertures $p^2$ $r'$ $m'$, and when the slide R is slid to close the apertures $p^2$ no feed can be spilled through the latter while charging the bins, and the holes in the slide R are directly underneath the hoppers P, allowing the feed to drop through to the bins.

The slide R, instead of being continuous, may be made in two or more sections.

In order to inspect the contents of the bins and facilitate the manipulations of feeding the live stock, the wall L is provided with an opening or wicket, $l'$.

The buckets and troughs E H are operated from the central passage, M, by cords F going through holes in the walls L, and suitable device for fastening said cords, to keep the buckets at the desired elevation, and are charged with feed through similarly-operated trap-doors S, hinged in an opening in the bin-floor, one above each bucket.

By letting out the cord $s$ a little, so that the trap-door S will form a slide-board or hopper, as shown in Fig. 4, a portion of the cut feed will drop from the bin into the bucket.

A stop, $s'$, prevents the trap-door S from being raised in closing above the surface of the floor of the feed-bin.

Drink for the animals is supplied to the buckets from a tank, T, (or water-pipe, four to five inches in diameter,) arranged all along the inside of the outer walls of the second story, as shown in the drawings. The tank T is charged through the inlet-spout $t$, and has a small faucet, U, attached to its under side above each bucket, which latter is filled with water by turning the faucet-handle $u$, whose rod is long enough to reach from the faucet to the passage M, where the handle is operated. Directly underneath the floor of the passage M one or two pieces of hose, V, having nozzles $v$, are connected to the tank T at one or both ends of the car. The hose is supported upon hooks W under the floor of the passage M, and is accessible through the apertures $m'$, to wash and refresh the stalls and animals by sprinkling with water.

It is evident that, if desired, a car may be provided with two floors of stalls, and the animals in both stories be fed from the same upper store-rooms and bins by making suitable openings and guides in the floors and walls for hoisting the buckets and troughs accordingly.

The tank T may be placed directly underneath the upper floor; but I prefer placing it where shown, as the higher it is placed the better will it work in sprinkling the stable-floor.

To enable the attendant of a train of cattle-cars to pass safely from the feed-floor of one car to that of the next, I provide at each end of the central passage, M, a hinged bridge or platform, X, of length equal to about one-half of the shortest distance between two adjacent cars when coupled together. These are provided on their under side with cleats or shoulders $x$, arranged to act as stops against the outside of the end walls of the car when the bridge is lowered to a nearly horizontal position, as shown in Fig. 1, and have also circular side rails or braces, Y, sliding against the surface of the passage-walls L when the bridge is being raised or lowered. Upon the end of of each brace Y is formed a toe or hook, $y$, which acts as stop against a pin, Z, in the wall L when the bridge is lowered; and on the edge of the brace opposite to the hook $y$ is formed a welt, $y'$, which acts against another pin, Z', in the wall L with friction enough (when the bridge is raised to bring the welt past the said pin) to hold the bridge X in the vertical position until the attendant from the lowered bridge of the next car pulls the former bridge down to enable him to pass from one car to the other.

Having thus described my invention, I claim as new and desire to secure by Letters Patent—

1. In a freight-car for live stock, the hinged head-posts A, in combination with chains or ropes D $d'$ $d^2$, for rapidly dividing the car into stalls and pens, substantially as specified.

2. A freight-car divided by posts and chains A D into stalls, of which those adjacent to each other are arranged to face alternate side walls of the car, and in which the rear floor-space of each stall is provided with an outward incline, H', having floor-opening $h'$, with cover I, in connection with a rake-aperture, J, substantially as and for the purpose set forth.

3. In a freight-car for live stock, the rods B, passing through the walls, and the horizontal bars C, and provided with collars or shoulders $b^2$, to adapt them for use as hinge-pins for the head-posts A, substantially as specified.

4. A freight-car for live stock provided with a separate hoisting bucket or trough, E H, for each separate stall, to convey feed and water from the store-room to the stable-floor, substantially as specified.

5. A stall-head formed of a pair of hinged plates, A, having reverted edges $a^2$, in combination with a bucket, E, provided with the guide-grooves $e'$, substantially as and for the purpose set forth.

6. A stall-head formed of a pair of hinged plates, A, having the reverted edges $a^2$, and the vertical hitch-bars G, in combination with the buckets E and collar-chains $g'$, substantially as and for the purpose set forth.

7. In combination with the stable-room of a freight-car for live stock, an upper store-room, N N, divided by the walls L and partitions $n'$ into a longitudinal central passage, M, and lateral feed-bins O O', substantially as specified.

8. The hinged trap-doors S, arranged in the floor of the feed-bins O O', and operated from the central passage, M, of the feed-store of a freight-car for live stock, in combination with the separately-hoisting buckets E, arranged one in each stall, substantially as specified.

9. In a freight-car having an upper story divided by the walls L and partitions $n'$ into a longitudinal central passage, M, and lateral feed-bins O O', the combination, with the water-tank T, of the water-taps U, having handles $u$, arranged through the feed-bins and the walls L, to be operated from the central passage, M, substantially as specified.

10. The device for charging a pair of feed-bins, O O', simultaneously—viz., the combination, with the said feed-bins and the central hopper, P, of the angular feed-board Q Q', arranged astride the central passage, M, substantially as specified.

11. In a freight-car for live stock, the slide R, having openings $r'$, and arranged subjacent to the hoppers P and intermediate vents, $p^2$, of the central portion of the roof, in combination with the feed-boards Q Q' and bins O O', for the purpose of closing the apertures $p^2$ while opening and filling the feed-bins, substantially as specified.

12. In a freight-car for live stock, the bridge X, hinged at the end of the central passage, M, of the feed-store, and provided with the side rails or braces, Y, in combination with suitable retaining-catches and stops $x\, y\, y'\, Z\, Z'$, substantially as and for the purpose set forth.

THOMAS CLARKE.

Witnesses:
SIGFRID LINDHAGEN,
C. SEDGWICK.